March 23, 1926.
A. C. MABEE
1,578,048
CHECK WRITER AND PROTECTOR
Filed July 7, 1923      3 Sheets-Sheet 1
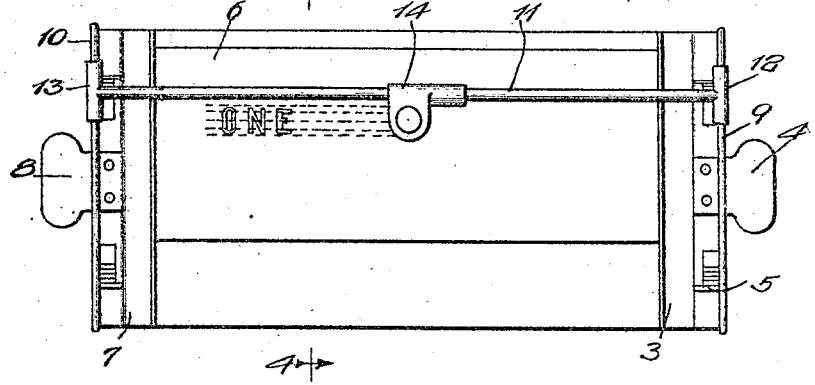
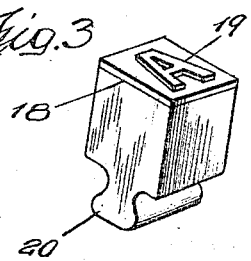
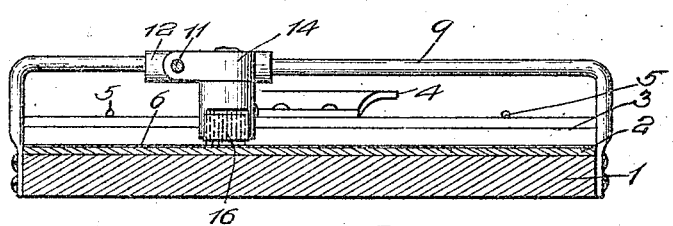
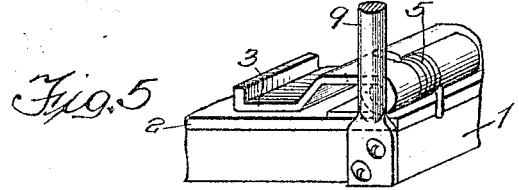
Witnesses:
W. P. Kilroy
Harry R. L. White
Inventor:
Alexander C. Mabee March 23, 1926.  1,578,048
A. C. MABEE
CHECK WRITER AND PROTECTOR
Filed July 7, 1923    3 Sheets-Sheet 2
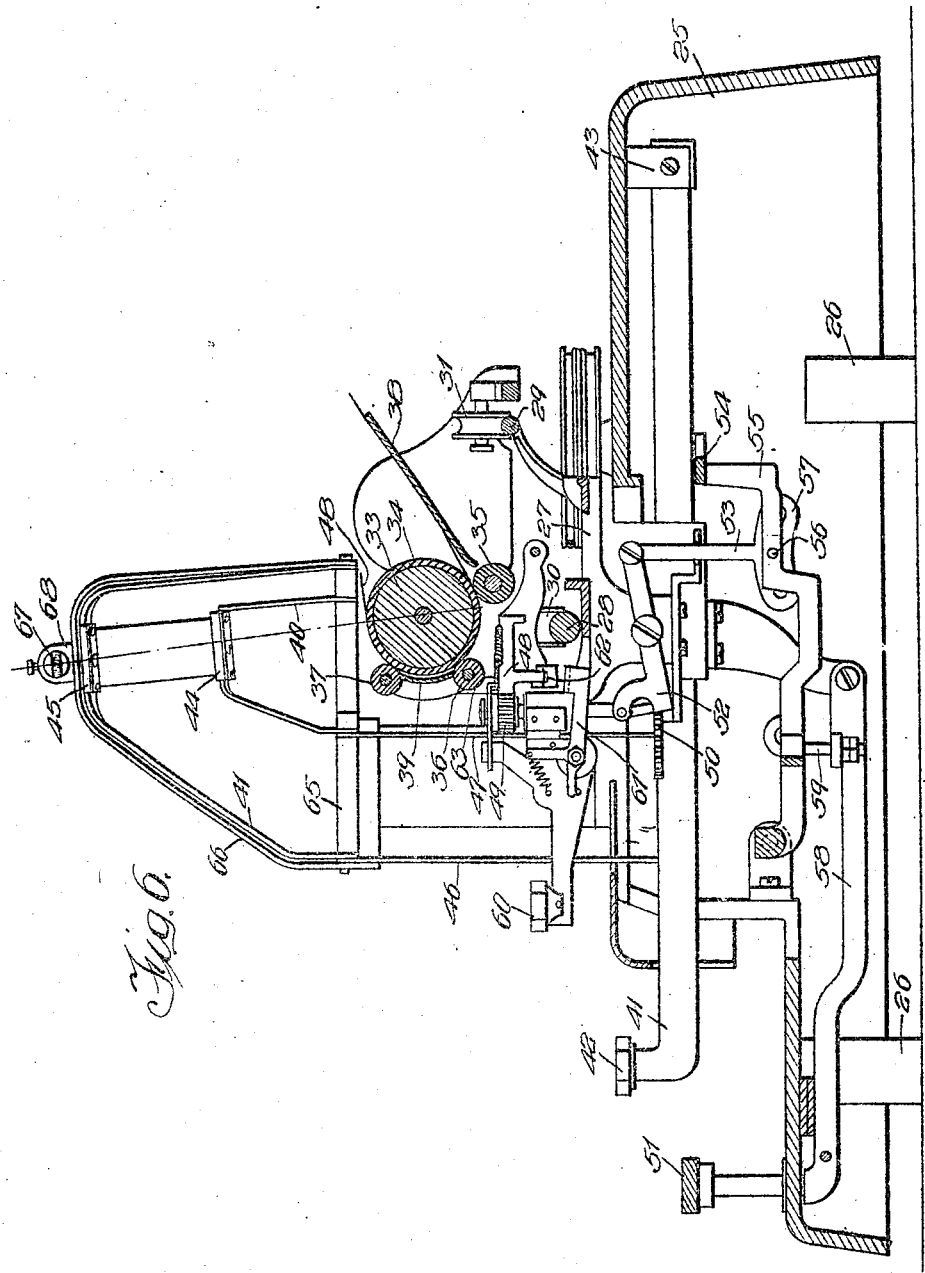

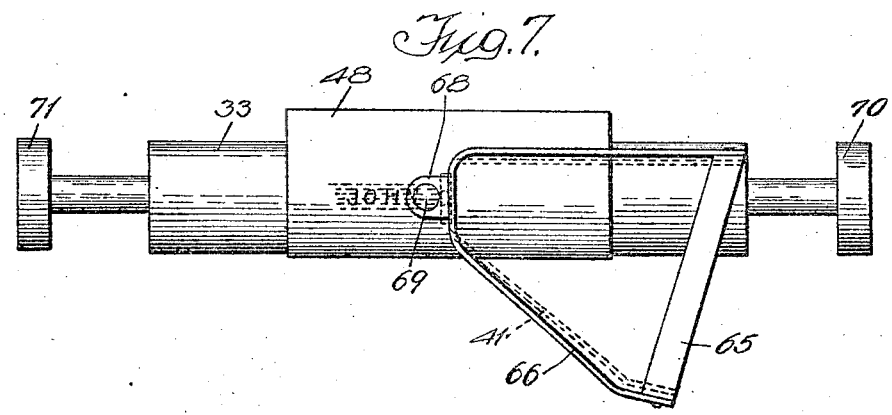
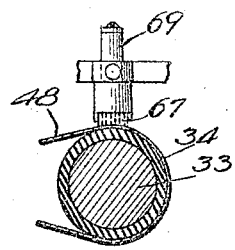
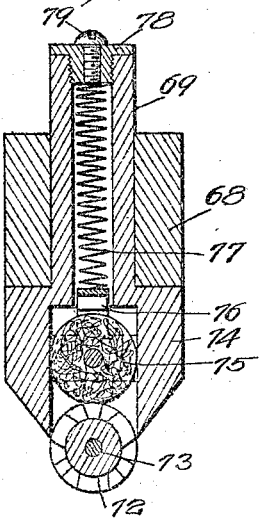
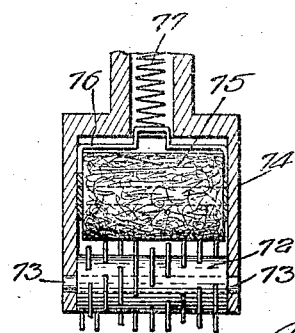

Patented Mar. 23, 1926.

1,578,048

UNITED STATES PATENT OFFICE.

ALEXANDER C. MABEE, OF VILLA PARK, ILLINOIS.

CHECK WRITER AND PROTECTOR.

Application filed July 7, 1923. Serial No. 650,106.

*To all whom it may concern:*

Be it known that I, ALEXANDER C. MABEE, a citizen of the United States, residing at Villa Park, in the county of Du Page and State of Illinois, have invented a certain new and useful Improvement in Check Writers and Protectors, of which the following is a full, clear, concise, and exact description, reference being had to the accompanying drawings, forming a part of this specification.

My invention relates to the writing and protection of checks or other commercial papers and the like.

In the writing of checks it is usually necessary to write first the date, second, the payee, third, the amount both in words and figures, and fourth, the signature.

It is common practice at present to write either in long-hand or on the typewriter, the date, the payee, the amount, and then finally secure the signature of the one making out the check. If the check is then to be protected it may be treated or "protected" thereafter by hand or by machine in any well known manner.

This involves at least three operations.

It is also common practice to write out the date and payee by long-hand or on the typewriter, and then write by means of a check writer or check protector the amount and thereafter affix the signature.

There have been developed special machines for writing out checks and for protecting them under the above method of procedure. In general, it is desirable to protect the name of the payee and the amount. The signature is not generally protected. It is its own protection and it is not altered, as it is the one thing required to make the check authentic.

I have observed that it is possible to dispense with one handling of the check by performing all the writing (except the signature) and all the protecting upon one machine without taking the paper out of its position in said machine.

I perform these operations of writing and protecting, a sequence which permits of complete and correct writing out and examination of the check, and the making of corrections in the writing if desired before applying the protecting feature all without losing control of the paper or its registration with the writing means. The protecting feature is then applied without taking the paper out of the control of the means which holds it during the printing or writing operation.

According to the preferred form of my invention, I employ a rubber face platen in the form of a roller having paper gripping means for advancing the paper on the periphery of the roller, and a carriage for permitting axial movement of the roller with its paper.

Co-operating with the platen is a protecting member or cutter in the form of a relatively small roller or cylinder bearing preferably, discontinuous cutting or pricking edges or points for cutting, shredding or piercing the paper on said platen without materially weakening it for the purposes of handling, and without effacing the writing. This roller or cutter has its axis at substantially right angles to the axis of the platen roller and in a different plane, but is so arranged that the surfaces of the two cylinders or rollers namely, the protecting roller or cylinder and the platen roller or cylinder are substantially tangent, but this tangency is modified by the resiliency of the face of the platen to the extent of securing yielding contact of the protecting roller or cutter with the platen roller for the dual purpose of securing easy puncturing or cutting of the paper and also to secure effective contact with the desired width of paper on the platen so as to protect a surface instead of a line. This surface should preferably be as wide as a written line plus a margin. In connection with the above I provide an escapement and ribbon together with type and type bars or other typing means such as constitute the usual parts of a typewriter.

Now, since the suitable platen paper holding means, type bars, ribbon, type, escapement, guides and incidentals are already organized in present commercial typewriters, I may employ the usual commercial typewriter complete as a part of my machine and combine therewith the protecting roller and support to make up my complete combination or machine.

I am aware that special means have been provided in combination with the usual parts of a typewriter to cross out a written line, to produce an underscore, and the like, but these devices work through the ribbon and do not perforate the paper any more than does the usual type mounted on the type bars.

It is further to be noted that the device of my invention automatically registers the perforator or cutter horizontally, that is, along the typewritten line, but the cutting or protecting face does not line up vertically with the spacing of the letters and does not deface or mask the written characters. Its mark is of a different character from the typed impression and hence cannot confuse or even alter the writing which is done with the type. The rotary cutter preferably has sharp knife edges which are staggered or made discontinuous for the dual purpose of preventing complete severing of the paper and also to secure the effect of cutting through the paper and depressing the resilient platen without penetrating the surface of the platen.

I consider that the invention comprises a novel art and have drawn the appended claims with this in mind.

Numerous advantages and differences over the prior art are embodied in my invention.

In order to acquaint those skilled in the art with the manner of constructing and operating one form thereof, I shall now describe a specific embodiment in connection with the accompanying drawings.

In the drawings:—

Figure 1 is a plan view of a device embodying my invention;

Fig. 2 is a plan view of the movable printing characters or type used in connection with the device of Fig. 1 to carry out in a simple manner the process of my invention;

Fig. 3 is an enlarged isometric view of one of the printing characters of the step shown in Fig. 2;

Fig. 4 is a sectional view taken on the line 4—4 of Fig. 1;

Fig. 5 is a fragmentary isometric view of one of the spring holding clips for gripping the edges of the check or other paper to be printed and protected;

Fig. 6 is a transverse vertical sectional view of a writing and protecting machine embodying my invention;

Fig. 7 is a dissected fragmentary view showing the registration of one of the type bars and the registration of the protector bar and its supported cutter or roller upon the platen or traveling support for the paper;

Fig. 8 is a fragmentary sectional view showing the manner in which the protecting roller or cutter perforates or cuts a relatively wide longitudinal strip of the paper coincident with the registering line of writing; and Figs. 9 and 10 are sectional views illustrating the construction of the perforating or protecting roller or cutter and its mounting.

In order to clarify the explanation I have shown in Figures 1 to 5 a simplified embodiment of the invention, and have shown in Figures 6 to 10 inclusive the preferred form of the invention embodied in a commercial machine.

Referring now to the embodiment of Figures 1 to 5, I provide a base plate or board 1 which has a rubber face 2 which serves as a platen. This need not necessarily be rubber: it may be any other composition which secures the same result, of supporting the paper while it is being written upon and then perforated, pierced, punctured or shredded as will be explained later. A spring clamping member 3 having an operating handle or finger piece 4 is hinged as is clearly shown in Fig. 5 at the right-hand end of the device shown in Fig. 1. This spring clip has a suitable coiled spring 5 for holding the adjacent end of the paper strip 6 shown in Fig. 1 upon the platen 2. A similar spring clip 7 is mounted at the left-hand side and it has a suitable finger piece or handle 8.

By means of these spring clips 3 and 7 the check or paper strip 6 is held in a definite position on the platen so that it will not move out of register with the printing and protecting means and the guides therefor. Guiding bars 9 and 10 are mounted at the ends of the base board and they serve to guide in parallel relation the longitudinal guiding rod 11 to suitable slides 12 and 13 which move on the rods 9 and 10. The guiding rod 11 serves as a guide for a sliding member 14 which sliding member is also rotatable upon said guiding rod 11. This sliding member 14 is a support for the rotary cutter 16. This rotary cutter is of the same character described in connection with Figures 9 and 10 and will be described more in detail. Suffice it to say that it consists of helical rows of thin sharp knives having their edges lying in planes at right angles to the axis of the cutter.

In Figure 2 is shown a box of type or stamps shown in detail in Figure 3. This box of stamps indicated at 17 comprises a suitable number of printing characters to write or print the desired words, figures or characters upon the check or paper 6. It will be understood that I use the word "write" in its broadest sense. An individual type or block as shown in Figure 3 comprises the mounting block 18, the face or printing character 19 and a suitable handle 20. When the device is to be employed for the purpose of my invention, the check 6 is first gripped under the spring clamps 3 and 7 and then the longitudinal guiding bar 11 is suitably placed above the line where it is desired to print, and the printing blocks or characters are then brought successively into alignment being guided at their upper edges by said guiding rod 11 to secure alignment of the successive types or printing blocks. The slider 14 may be employed for assisting in securing registration of the type blocks, and to this end the longitudinal guiding rod 11 may be graduated so as to assist in proper spacing of the printed characters, letters or symbols. That is to say the slider 14 may be placed so that the printing block 18 as shown in Figure 3 may be placed in the corner between said slider 14 and the longitudinal guiding rod 11 with the assurance that the resulting impression will be in proper alignment. After the desired characters or letters have been printed or otherwise impressed upon the check or paper 6, the slider 14 is then rotated to bring the rolling shredder or protecting roller against the face of the paper, and this roller is then pressed down and moved longitudinally by means of sliding movement of the slider 14 upon the guiding rod 11. Alignment is thus assured and the rotary cutter or shredder will suitably act upon the paper along the written line and in registration therewith, preferably cutting a path as wide as the printed line plus half a margin above and below. This width may naturally be varied.

The guiding rods 10 and 9 at the ends may similarly be graduated to assist in proper spacing of the lines of writing with respect to each other if desired. The above operation of first lining up the type vertically and horizontally, and simultaneously lining up the protecting roller or cutter may be repeated to the desired extent.

Now, it is to be observed that the roller 16 is a progressive cutter. By this I mean that its action may be extended indefinitely and that it does not necessarily produce cuts or perforations which are aligned with the type. It produces a fairly broad band of small incisions or cuts or perforations which do not deface the printed characters or the writing, and which operate to the same degree between the characters as upon them.

It will be observed that any portion of the sheet may be reached by the printing means and the protecting means, and that when the printing means is lined up to print along a certain line, the protecting means is automatically lined up at the same time. This roller, which has the discontinuous cutting or perforating surface is, however, continuously in contact with the paper on the platen so long as it is operating. It moves in contact with the paper longitudinally with respect to the platen, that is, along the written line. The written line is visible and may be corrected as it never moves out of registration with the printing type before perforation is accomplished. This perforator or protector uses ink of a different character and makes a cut in the paper which is of an entirely different character from the impressions made by the type or writing and ink is injected into the cut by an inking pad which wets the knife edges of the rotary cutter or protector.

All of the above advantages and features are present in the commercial form of device shown in Figures 6 to 10 inclusive.

The writing machine forming a part of my combination as shown in Figures 6, 7, 8, 9 and 10 is of the type known in the trade as the "Oliver" machine. While I have illustrated this particular form of writing machine as providing suitable elements for the complete combination of my invention, it is to be understood that the invention is not limited to this particular grouping of elements, but that this grouping of elements does embody the invention and indicates how the invention may be embodied in other machines. Referring more particularly to Figure 6, the base of the machine is indicated at 25. It has the supporting legs 26. A frame 27 by which the paper carried is immediately supported, has shifting movement backward and forward on said base plate or frame 25, and it is herein called the shift frame. This shift frame is movable back and forth for the purpose of aligning the writing line on the platen with the selected type on the type bars. This shift frame is adapted to be rocked back and forth by a suitable shift key (not shown). This shift frame supports two longitudinal guide rods 28 and 29 upon which is mounted through the intermediary of the rollers 30 and 31 a longitudinally traveling carriage of well known construction including the roller 33 having a rubber face or platen 34. This face may have any suitable composition for providing a resilient surface of the type generally employed for typewriters. Co-operating resilient rollers 35, 36 and 37 and suitable guides, including plates 38 and 39, guide the paper and hold the same upon the roller or platen. Suitable type bars such as shown at 40 and 41 are pivoted on a frame secured to the stationary frame 25 and are adapted to be actuated by key levers 41 having suitable keys 42. These key levers such as 41 are pivoted at the rear as indicated at 43 to the base frame 25. These type bars 40 bear suitable type such as indicated at 44—45 adapted to register with the printing line on the platen 34. The type bars with their supported type are adapted to be connected through operating rod such as indicated at 46—47.

The rotary platen has suitable means for holding the same against accidental rotary displacement and for providing suitable rotary facing so that succeeding lines written upon the paper 48 will be suitably vertically spaced. The longitudinally movable carriage is also provided with suitable escapement means comprising a rack bar 48, pinion 49 and escapement wheel 50. This escapement wheel is adapted to be released one step by actuation of any one of the keys such as 42 or by actuation of the spacing bar 51 through the medium of an escapement lever 52, which escapement lever is connected by link 53 to the universal bar 54 which underlies all of the key levers 41 and is adapted to be depressed by them. This universal bar 54 is supported upon swinging levers 55, and it has pins such as 56 connecting it through a yoke 57 with the link 53. The connection between the escapement lever 58 and said swinging lever 55 is indicated at 59. The pinion 49 may be disconnected from the rack 48 for permitting free longitudinal sliding movement of the carriage and consequently of the platen 34 by operation of the tabulator key 60 which has an arm 61 co-operating with a stop 62, or by means of the manually controllable slide 63 which can be operated from either end of the platen roller 33.

I have intended above to outline briefly the necessary operating parts of the paper supporting, feeding and writing means such as is now organized in the "Oliver" writing machine. For further detail illustration of these parts all of which above mentioned are well known, I now refer to Patent No. 916,720 of March 30, 1909 and No. 946,245 of January 11, 1910.

It will be noted that the swinging type bars 41 are U-shaped and the ends of the U are pivoted upon a suitable frame member such as indicated at 65 in Figures 6 and 7. I provide an additional U-shaped swinging bar 66, the ends of which are so pivoted as to swing the rotary cutter 67, which is mounted in a suitable holder 68 on said bar 66, into accurate registration with the writing line on the platen 34.

This swinging bar 66 which bears a protecting cutter or roller 67, may be swung down by means of one of the keys such as 42 is desired, but in the form of machine illustrated, I have arranged to have this swung down by grasping either the bar 66 or the upwardly projecting stem 69 of the mounting for the roller 67 in the hand and pressing the same down upon the paper on the platen 34.

In Figure 7 I have indicated in dotted lines how one of the type bars registers on the paper 48 held on the platen 33, and how the rotary perforator or roller 67 also aligned with the printing or writing line on said paper. The rotary platen, which as previously mentioned is mounted for longitudinal movement, is adapted to be held as by means of the knobs 70 or 71 with one hand and the protecting device mounted on the bar 66 is swung down into engagement with the paper, and then by manually releasing the carriage, the platen 33 bearing the paper 48 may be moved longitudinally under said rotary cutter 67, and the written line protected by the series of perforations or slits which this cutter makes in the paper. The construction of the cutter and its mounting is shown in Figures 9 and 10. The cutter comprises a roller 72 having suitable bearings 73 at its opposite ends in the cylindrical supporting frame member 74. This roller has helical rows of sharp cutting edges formed thereon, these cutting edges lying in planes substantially normal to the axis of the roller, although it is not essential that they be strictly normal. I have found, for instance, that the desired effect may be secured by crossed screw threads. The roller resembles a hub cutter. Instead of the series of sharp cutting edges, a series of sharp points might be provided although I find that the latter does not secure the same desirable feature. An inking roller having a soft absorbent surface, is indicated at 75. This roller is mounted in a carriage 76 within the mounting 74 and the carriage is pressed downwardly so that the inking roller 75 engages the teeth on the rotary cutter 72 as by means of the spring 77 which is housed in the barrel of the mounting 69. The upper end of the barrel is closed by means of a cap 78 which, however, has a filling plug 79 through which ink preferably red or carmine ink is introduced for inking the cutting roller 72.

The operation of the device of my invention as embodied in Figures 6 to 10 will be apparent from the above description. The paper 48 is put in place upon the platen 34 where it remains until removed even though the paper be advanced rotarily by rotating the platen 33 or be advanced laterally by sliding the carriage endwise. The keys may be operated in the usual manner to write upon the piece of paper 48 and corrections may be made all as heretofore known in the art. Then, when the writing of a particular line has been completed, the protecting member including the roller or cutter 67 may then be brought into play, this member being automatically aligned with the writing line on the platen and by relative motion between the platen and the cutter, the paper is protected, that is, slit in a series of staggered slits with the injection of a suitable indelible ink into the slits or cuts or perforations. This bringing of the protecting cutter into registration with the printed line may be secured by a suitable key or it may be performed manually. In each case the rotary cutter 67 comes directly into engagement with the paper 48 without the interposition of the usual ribbon which is required in typing or writing.

The cutting or protecting roller is preferably of small diameter to bring relatively sharp contact and high unit pressure upon the cutting edges. These cutting edges engage the platen longitudinally and in very closely spaced slits or cuts which do not register with the type impression.

I have observed that the space between printed characters on the paper is perforated to a greater extent than the paper directly under the printed character. This I believe to be due to the fact that the type pounds down the platen at the registration point between the type and the platen, leaving between such pounded-down places slightly raised surfaces which consequently support the paper at a slightly elevated position and cause cutting more deeply at the points between the type impressions.

If desired the endwise movement of the platen may be caused by operation of the tabulating key. Thus by swinging the cutting or protecting roller 67 down by means of a key and releasing the carriage by means of a tabulating key, the entire operation of protecting the written line may be performed from the keyboard. The operation of protecting may be performed upon a single thickness of sheet or it may be performed upon multiple sheets, or it may be performed through a top sheet and a lower sheet with a carbon between them.

It will be apparent that as the cutting or perforating roller 67 presses against the paper 48, it is able to protect a relatively wide strip along the length of the written line for two reasons. First, the fact that the pressure of the protecting or cutting roller tends to flatten the relatively yielding platen 34 under it and thus secure a fairly wide surface contact; and next, because the central pieces on the cutting roller 67 may embed themselves slightly in the surface of the platen 34.

I do not intend to be limited to the details shown and described.

I claim—

In combination, a resilient platen having paper holding means cooperating therewith to hold the paper definitely in register thereupon, writing means comprising movable type, suitable guiding means for guiding the type successively into registration on the paper held on the platen and produce a written line, paper shredding means comprising a rotary cutter having a face wide enough to shred the paper over a width substantially the width of the written line, and guiding means for guiding the cutter in register longitudinally along the written line.

In witness whereof, I hereunto subscribe my name this 30th day of June, 1923.

ALEXANDER C. MABEE.